United States Patent Office 3,013,926
Patented Dec. 19, 1961

3,013,926
PROCESS OF PREPARING COATED, LAMINATED, AND SIZED ARTICLES AND PRODUCTS PRODUCED THEREBY
Henry E. Railsback, Bartlesville, Okla., and Quentin L. Morris, Natchitoches, La., assignors to Phillips Petroleum Company, a corporation of Delaware
No Drawing. Filed Jan. 30, 1958, Ser. No. 712,089
6 Claims. (Cl. 156—331)

This invention relates to a process of preparing coated, laminated, and sized articles and products produced thereby.

A great many coating compositions are available in the art and liquid polymeric materials have been widely used as varnish substitutes, adhesives, and laminating agents. For such coatings, resistance to deterioration in the process of fabrication, bending, subsequent handling, etc., is important and also desirable is resistance to the action of acids, alkaline materials, and organic solvents.

The present invention relates to coating compositions prepared from rubbery polymers of the type exemplified by butadiene/styrene copolymers and butadiene/vinyl-pyridine copolymers.

The following are objects of our invention.

An object of our invention is to provide a new process of preparing coated, laminated, and sized articles. A further object of the invention is to provide coated articles. A further object of our invention is to provide laminated articles. A further object of the invention is to provide sized articles. A further object of our invention is to provide new compositions for use in preparing these articles.

Other objects and advantages will be apparent to one skilled in the art upon reading this application.

The compositions of the present invention are suitable for application to metal, glass, paper, wood, plastics, and cotton, silk, wool, and synthetic fabrics. As will be later evident, certain of the compositions are more suited for application to one or two of these types of materials although they all can be used for each of the materials.

Broadly, the invention is based upon the discovery of a process of preparing the coated article which comprises dissolving in an aromatic solvent a rubbery polymer and applying the resulting solution to the surface of the article. After application, the coating is treated to convert it to a tough, adherent coating. As the data show, the resultant coatings exhibit exceptional resistance to a large variety of solvents. Suitable rubbery polymers are prepared by polymerizing a single conjugated diene, a mixture of conjugated dienes, or one or more of these dienes with a mono-olefinic compound copolymerizable therewith.

Preferred conjugated dienes are those containing 4 to 8 carbon atoms although dienes containing up to 12 carbon atoms can be used. Examples of these dienes include 1,3-butadiene, isoprene, 2-methyl-1,3-butadiene, 2,3-dimethyl-1,3-butadiene, 2,3-dimethyl-1,3-hexadiene, etc. Various alkoxy, such as methoxy and ethoxy, cyano, and halo-derivatives of these conjugated dienes, are also applicable. Such dienes include, by way of example, 2-methoxy-3-ethylbutadiene, 2-methoxy-3-ethyl-1,3-pentadiene, 2-ethoxy-1,3-butadiene, 2-cyano-1,3-butadiene, 2-chloro-1,3-butadiene, etc.

The mono-olefinic compounds, copolymerizable with the dienes, are well-known in the art and include, for example, styrene, para-chlorostyrene, para-methoxystyrene, alpha-methylstyrene, vinylnaphthalene, acrylic acid, methacrylic acid, methyl acrylate, ethyl acrylate, methyl alpha-chloroacrylate, methyl methacrylate, ethyl methacrylate, butyl methylacrylate, methyl ethacrylate, acrylonitrile, methacrylonitrile, methacrylamide, methyl isopropenyl ketone, methyl vinyl ketone, methyl vinyl ether, vinyl acetate, vinyl chloride, and vinylidene chloride.

A group of monomers which are of particular importance in some specific aspects of our invention as monomers copolymerizable with the conjugated dienes are those of the pyridine, quinoline, and isoquinoline series which contain one, and only one

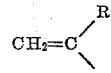

substituent where R is either hydrogen or a methyl group. That is, the substituent is either a vinyl or an alpha-methylvinyl group. Of these, the compounds of the pyridine series are of the greatest interest commercially at present. Various substituted derivatives are applicable but the total number of carbon atoms in the groups attached to the carbon atoms of the heterocyclic nucleus in addition to vinyl or alpha-methylvinyl group should not be greater than twelve because the polymerization rate decreases somewhat with increasing size of the alkyl group. Compounds where the alkyl substituents are methyl and/or ethyl are available commercially. These heterocyclic nitrogen bases have the formula:

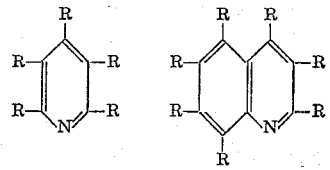

or

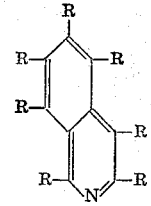

where R is selected from the group consisting of hydrogen, alkyl, vinyl-alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups, in addition to the vinyl or alpha-methylvinyl group, being not greater than twelve. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2,3-dimethyl-5,6-dipentyl-3-vinylpyridine; 2-decyl-5-(alpha-methylvinyl)pyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl)-pyridine; 3-vinyl-5-phenylpyridine; 2-(para-methyl-phenyl)-3-vinyl-4-methylpyridine; 3-vinyl-5-(hydroxyphenyl)-pyridine; 2-vinylquinoline; 2-vinyl-4-ethylquinoline; 3-vinyl-6,7-di-n-propylquinoline; 2-methyl-4-nonyl-6-vinylquinoline; 4-(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxy-8-methylisoquinoline; and the like. Mixtures of these heterocyclic nitrogen bases can be used, if desired.

The coating compositions are prepared by dissolving the polymeric material in an aromatic solvent such as benzene, toluene, or xylene, the amount of material used normally being sufficient to give a concentration of 0.5 to 10 weight percent of the polymer in the solvent. The amount of solvent is selected to provide a coating composition suitable for dipping, spraying, and brushing applications, a viscosity of D or thinner on the Gardner scale being used for brushing and dipping and C or thinner for use when spraying is used for the coating application. The resulting solution, after application to the material to be coated, can be converted to a tough, adherent coating by baking it in the range of 300 to 500° F. for a period of 5 to 60 minutes. It will be obvious to those skilled in the art that products baked at the lower temperatures are baked for times in the upper portion of the range set forth and that shorter times are used at the higher temperatures. Coatings so applied are tough, flexible, and resistant to the action of many solvents.

When a heterocyclic nitrogen base is copolymerized with the conjugated diene, we have developed a variety of methods by which the coating can be converted to the tough, adherent coating. In one method, the polymer, such as a butadiene-2-methyl-5-vinylpyridine copolymer is dissolved in the aromatic solvent as set forth above and applied to the article. Particularly novel is that, after drying, the coating is exposed to gaseous hydrogen chloride, gaseous hydrogen bromide, or gaseous hydrogen iodide at a temperature between 30 and 200° F., room temperature being quite suitable for this treatment. When so treated, the copolymer reacts with the hydrogen halide to give a product which is flexible and which resembles a vulcanized gum stock. The coatings are somewhat soft while being impervious to moisture, chemicaly resistant, and flexible. This combination of properties makes such treatment particularly applicable in providing coatings for wire, rendering fabrics and other surfaces impervious to water, and in providing a surface for the base of scatter rugs. The chemical treatment after application improves the properties of the coating.

By another method, a polymer of the conjugated diene and the copolymerizable heterocyclic nitrogen base is dissolved in the aromatic solvent as above set forth and the solution thereof treated with an acidic material such as gaseous hydrogen chloride, gaseous hydrogen bromide, gaseous hydrogen iodide, or with phosphoric acid. Where the treating agent is gaseous, the contacting is preferably done by stirring the polymer solution while maintaining the gas in contact with the upper surface thereof, although the gas can be passed into the solution. If phosphoric acid is used it is generally added by adding the acid dropwise into the polymer solution while stirring.

Regardless of which acidic material is used, the mixture becomes viscous and eventually forms a thick gel. Stirring becomes difficult at this point and the treatment is generally discontinued. This is satisfactory because it is preferred that not more than 75 percent of the basic nitrogen groups in the copolymer be reacted with the acidic treating agent. Discontinuing acid addition when the thick gel is formed generally produces a material with 25 percent or more unreacted basic groups in the polymer.

For application by brushing, spraying or dipping, suitable viscosities have previously been given. To provide such viscosities with the acid treated polymer solution it is necessary to add a small amount of a low molecular weight alcohol, the use of an excess being undesirable because excess alcohol will cause precipitation of the treated polymer. Suitable alcohols include methanol, ethanol and isopropanol. After treatment with the acid and adjustment of the viscosity, the material is coated and the coating thereafter baked at a temperaure of 300 to 500° F. for 5 to 60 minutes.

After baking, such coatings are not sticky but are hard, smooth, and resistant to the action of many solvents. They are of particular value as linings for metal and glass containers.

The solution prepared, as described immediately above, is also quite suitable for the production of laminates since it is particularly suitable as an adhesive. More particularly, it is very suitable as a cement or laminating agent for bonding such materials as paper, wood, and various fabrics to another layer of the same material or to combinations thereof, such as wood to paper, etc.

The laminates are prepared by applying the material to at least one of two surfaces to be joined by brushing, spraying, etc. The layers are then placed together and the assembly is dried, a good bond being obtained simply by drying at room temperature although, obviously, heating at elevated temperatures (to 500° F.) will increase the speed of bond formation. Multiple ply laminates are easily prepared by repeating the operation as many times as necessary to give the desired number of plies. Thus, it is obvious that products such as corrugated boxes, paper lined boxes, or other articles can be made and the material is also applicable for applying labels to wood or cardboard articles. These compositions provide bonds which are far stronger than those obtained with commercial rubber cement.

Another use to which the acid treating solution of a polymer containing a heterocyclic nitrogen base can be put is that of sizing porous materials such as paper and fabric made of cotton, wool, silk, etc. For such use, the polymer is, as above described, dissolved in an aromatic solvent, treated with the acid, and, after viscosity adjustment by addition of a low molecular weight alcohol, applied to the paper or fabric by dipping, spraying, or brushing. After application, the coating is dried at room temperature or at an elevated temperature (to 500° F.) if more rapid drying is required. Paper treated in this manner is rendered waterproof after the coating has dried and has a surface upon which one may write with ink. These sizing agents are also employed for rendering fabrics waterproof and, when built up in sufficient quantities, form a gum base which is suitable for scatter rugs.

A large number of runs have been made by us in order to determine preferred methods of practicing our invention. In the examples set forth hereafter a variety of treating solutions were used. Since the treating solutions were used in a variety of applications, the production of these solutions is first described.

COMPOSITION 1

A commercial rubber, a 1,3-butadiene/styrene copolymer containing 20 percent bound styrene by weight prepared by aqueous emulsion polymerization at 41° F. and having a Mooney viscosity (ML-4) of 52 was dissolved in benzene. A 3.7 weight percent solution was prepared using 10 grams of the polymer in 300 milliliters of benzene. The solution was made by breaking down the rubber on the rolling mill, cutting it into small pieces, and letting it stand for 24 hours in the solvent with occasional stirring. The polymer was completely soluble.

COMPOSITION 2A

A 1,3-butadiene/2-methyl-5-vinylpyridine copolymer, prepared by emulsion polymerization at 41° F. using an 85/15 monomer ratio and having a Mooney viscosity (ML-4) of approximately 45 was dissolved in benzene. A 3.7 percent solution was prepared using the same quantities as set forth in Composition 1. The copolymer was completely soluble in benzene.

COMPOSITION 2B

A solution identical with Composition 2A was prepared except for the fact that the monomer ratio used in preparing the polymer was 75 parts of 1,3-butadiene to 25 parts by weight of 2-methyl-5-vinylpyridine.

COMPOSITION 3A

A portion of the 3.7 percent solution of Composition 2A was treated with gaseous hydrogen chloride to convert a portion of the polymer to the hydrochloride salt by placing the delivery tube from a hydrogen chloride generator just above the surface of the solution, the mixture being stirred during this treatment. As the reaction proceeded the solution became viscous and eventually a thick gel was formed. At this point, stirring became difficult and the hydrogen chloride treatment was discontinued. To reduce the viscosity, methanol was added in an amount of 3.3 volumes thereof to 100 volumes of the hydrogen chloride treated solution.

To determine the amount of hydrogen chloride added, pentane was added to a portion of the gelled product in order to precipitate the salt. The precipitated polymer was separated and dried in vacuo at room temperature. Subsequent chlorine analysis indicated that the product contained 1.6 weight percent chlorine, this being less than 50 percent of that theoretically required for complete neutralization of the polymer.

COMPOSITION 3B

A portion of Composition 2B was treated with gaseous hydrogen chloride as in producing Composition 3A and the treated product was diluted with 7.5 volumes of methanol per 100 volumes of the treated solution.

COMPOSITION 3C

A portion of the gel produced in the production of Composition 3A (2A plus hydrogen chloride) was diluted with 2 volumes of methanol per 100 volumes of the treated solution.

COMPOSITION 3D

A portion of the gel produced in the production of Composition 3B (2B plus hydrogen chloride) was diluted was 4.5 volumes of methanol per 100 volumes of the treated solution.

The following examples illustrate specific embodiments of our invention using the above treated solutions, it being pointed out that the invention is not limited to the specific details of each of these examples.

*Example I*

Microscope slides and pieces of stainless steel shim stock were cleaned with a 5 percent solution of nitric acid in ethanol and dried. Several of each of these materials were coated with Composition 1 using both dipping and brushing techniques. Two sets of specimens were prepared, one set being baked at 350° F. for 30 minutes and the other at 400° F. for 30 minutes. All surfaces had the same light tan, smooth appearance, the coating adhering well to both surfaces and being quite tough. Flexibility of the coating was demonstrated by bending the coated metal through a 180° angle and then re-straightening, no cracking occurring.

*Example II*

Additional pieces of the cleaned stainless steel shim stock of Example I were coated with the rubbery copolymer solution (Composition 1) and baked 40 minutes at 400° F. The resistance of the coating to the action of various solvents was tested. The following observations were made after the strips were left in contact with the solvents for 4 hours at room temperature (approximately 75° F.):

| No. | Solvent | Observation |
|---|---|---|
| 1 | Glacial acetic acid | No effect on surface. |
| 2 | Ethanol | Do. |
| 3 | Benzene | Do. |
| 4 | Hexane | Do. |
| 5 | Methyl ethyl ketone | Do. |
| 6 | No. 10 motor oil | Do. |
| 7 | n-Propyl acetate | Do. |
| 8 | $CCl_4$ | Do. |
| 9 | Ethylene glycol | Do. |
| 10 | Nitropropane | Do. |
| 11 | Phenol | Do. |
| 12 | n-Butyl ether | Do. |
| 13 | Pyridine | Do. |

For comparison, commercial rubber cement was applied to stainless steel shim stock and baked 30 minutes at 400° F. The coating had a tendency to be sticky and came off in spots when rubbed with the fingers. It did not adhere to the metal as did the butadiene/styrene rubber coating.

*Example III*

Microscope slides and pieces of stainless steel shim stock were cleaned with a 5 percent solution of nitric acid in ethanol and dried. Composition 2A was applied thereto and the coated articles were allowed to dry at room temperature. Then they were exposed to gaseous hydrogen chloride at room temperature for about 15 minutes. The coating on each material adhered well, the coating being similar to vulcanized gum stock.

*Example IV*

The procedure of Example III was repeated, using Composition 2B with the same results.

*Example V*

Microscope slides and pieces of stainless steel shim stock were cleaned with a 5 percent solution of nitric acid in ethanol and dried. Portions of each of these materials were coated with Composition 3A by brushing or dipping. Two sets were prepared, one being baked at 400° F. and one at 350° F., the baking time being 30 minutes in each case. Light brown hard, smooth, nontacky coatings resulted.

*Example VI*

The procedure of Example V was repeated with Composition 3B with the same results.

*Example VII*

Additional pieces of stainless steel shim stock, cleaned as above, were coated with the 85/15 butadiene/2-methyl-5-vinylpyridine hydrochloride solution (Composition 3A) and baked 40 minutes at 400° F. The resistance of the coating to the action of various solvents was tested. The following observations were made after the strips were left in contact with the solvents for 4 hours at room temperature (approximately 75° F.):

| No. | Solvent | Observation |
|---|---|---|
| 1 | Glacial acetic acid | No effect on surface. |
| 2 | Ethanol | Do. |
| 3 | Benzene | Do. |
| 4 | Hexane | Do. |
| 5 | Methyl ethyl ketone | Do. |
| 6 | No. 10 motor oil | Do. |
| 7 | n-Propyl acetate | Do. |
| 8 | $CCl_4$ | Do. |
| 9 | Ethylene glycol | Do. |
| 10 | Nitropropane | Do. |
| 11 | Phenol | Do. |
| 12 | n-Butyl ether | Do. |
| 13 | Pyridine | Do. |

*Example VIII*

Composition 3C was brushed onto one side of a piece of white paper. A second piece of paper was pressed by hand over the coated surface and the laminate was allowed to dry at room temperature. When an attempt was made to pull the sheets of paper apart, the paper tore but the bond remained firm.

For comparison, a laminate was formed using the same paper and a commercial rubber cement. After drying at room temperature, the sheets of paper could be separated without tearing, the bond failing in the cement layer.

*Example IX*

Composition 3D was brushed onto one side of a piece of white paper and a laminate prepared as in Example VIII. After drying, the laminate could not be separated at the bond.

*Example X*

A paper towel was dipped into Composition 3C and dried at room temperature. After drying, the paper had a slick, slightly cream-colored surface. The paper was waterproof and the surface could be written upon with ink.

*Example XI*

A paper towel was dipped into Composition 3D and dried, the resulting product being similar to that of Example X.

*Example XII*

A piece of broadcloth was dipped into Composition 3C, the resulting product being allowed to dry at room temperature. The cloth was rendered waterproof and had a slightly tacky feel.

*Example XIII*

The procedure of Example XII was repeated with Composition 3D, the same results being obtained.

As many possible embodiments can be made of this invention without departing from the scope thereof, it is to be understood that all matter herein set forth is to be interpreted as illustrative and not as unduly limiting the invention.

We claim:

1. A process of preparing a coated article, said article being selected from the group consisting of metal, glass, and porous materials, comprising dissolving a rubbery polymer of a conjugated diene and a copolymerizable compound selected from the group consisting of pyridines and quinolines containing the group

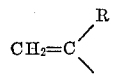

where R is selected from the group consisting of H and CH$_3$ in an aromatic solvent, contacting the resulting solution with a material selected from the group consisting of gaseous hydrogen chloride, gaseous hydrogen bromide, gaseous hydrogen iodide, and phosphoric acid in an amount sufficient to react with up to 75 percent of the basic nitrogen atoms in the polymer, diluting the treated solution with a low molecular weight alcohol, applying the diluted solution to the surface of said article, and baking the coating at a temperature of 300 to 500° F. for a time of 5 to 60 minutes.

2. A process of preparing a coated article, said article being selected from the group consisting of metal, glass, and porous materials, comprising dissolving a rubbery polymer of 1,3-butadiene and 2-methyl-5-vinylpyridine in benzene, contacting the resulting solution with gaseous hydrogen chloride in an amount sufficient to react with up to 75 percent of the basic nitrogen atoms in the polymer, diluting the treated solution with methanol, applying the diluted solution to the surface of said article, and baking the coating at a temperature of 300 to 500° F. for a time of 5 to 60 minutes.

3. A process of preparing a laminate of materials selected from the group consisting of metal, glass, and porous materials, comprising applying to at least one of two surfaces to be joined a composition prepared by dissolving in an aromatic solvent a rubbery copolymer of a conjugated diene and a copolymerizable compound selected from the group consisting of pyridines and quinolines containing the group

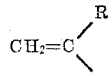

where R is selected from the group consisting of H and CH$_3$, contacting the resulting solution with a material selected from the group consisting of gaseous hydrogen chloride, gaseous hydrogen bromide, gaseous hydrogen iodide, and phosphoric acid in an amount sufficient to react with up to 75 percent of the basic nitrogen atoms in the polymer, and diluting the treated solution with methanol, placing said surfaces to be joined in contact, and drying the resulting laminate.

4. A process of preparing a laminate of materials selected from the group consisting of metal, glass, and porous materials, comprising applying to at least one of two surfaces to be joined a composition prepared by dissolving in benzene a rubbery polymer of 1,3-butadiene and 2-methyl-5-vinylpyridine, contacting the resulting solution with gaseous hydrogen chloride in an amount sufficient to react with up to 75 percent of the basic nitrogen atoms in the polymer, and diluting the treated solution with methanol, placing said surfaces to be joined in contact, and drying the resulting laminate.

5. A process of sizing porous articles comprising applying to a porous article a composition prepared by dissolving in an aromatic solvent a rubbery copolymer of a conjugated diene and a copolymerizable compound selected from the group consisting of pyridines and quinolines containing the group

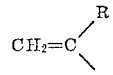

where R is selected from the group consisting of H and CH$_3$, contacting the resulting solution with a material selected from the group consisting of gaseous hydrogen chloride, gaseous hydrogen bromide, gaseous hydrogen iodide, and phosphoric acid in an amount sufficient to react with up to 75 percent of the basic nitrogen atoms in the polymer, and diluting the treated solution with methanol, and drying the resulting article.

6. A process of sizing porous articles comprising applying to a porous article a composition prepared by dissolving in benzene a rubbery polymer of 1,3-butadiene and 2-methyl-5-vinylpyridine, contacting the resulting solution with gaseous hydrogen chloride in an amount sufficient to react with up to 75 percent of the basic nitrogen atoms in the polymer, and diluting the treated solution with methanol, and drying the resulting article.

References Cited in the file of this patent

UNITED STATES PATENTS

| | | |
|---|---|---|
| 2,136,544 | Gebauer-Fuelnegg et al. | Nov. 15, 1938 |
| 2,140,835 | Gebauer-Fuelnegg et al. | Dec. 20, 1938 |
| 2,255,564 | Gebauer-Fuelnegg et al. | Sept. 9, 1941 |
| 2,273,452 | Snyder | Feb. 17, 1942 |
| 2,431,001 | Sullivan | Nov. 18, 1947 |
| 2,888,436 | Pritchard | May 26, 1959 |